UNITED STATES PATENT OFFICE.

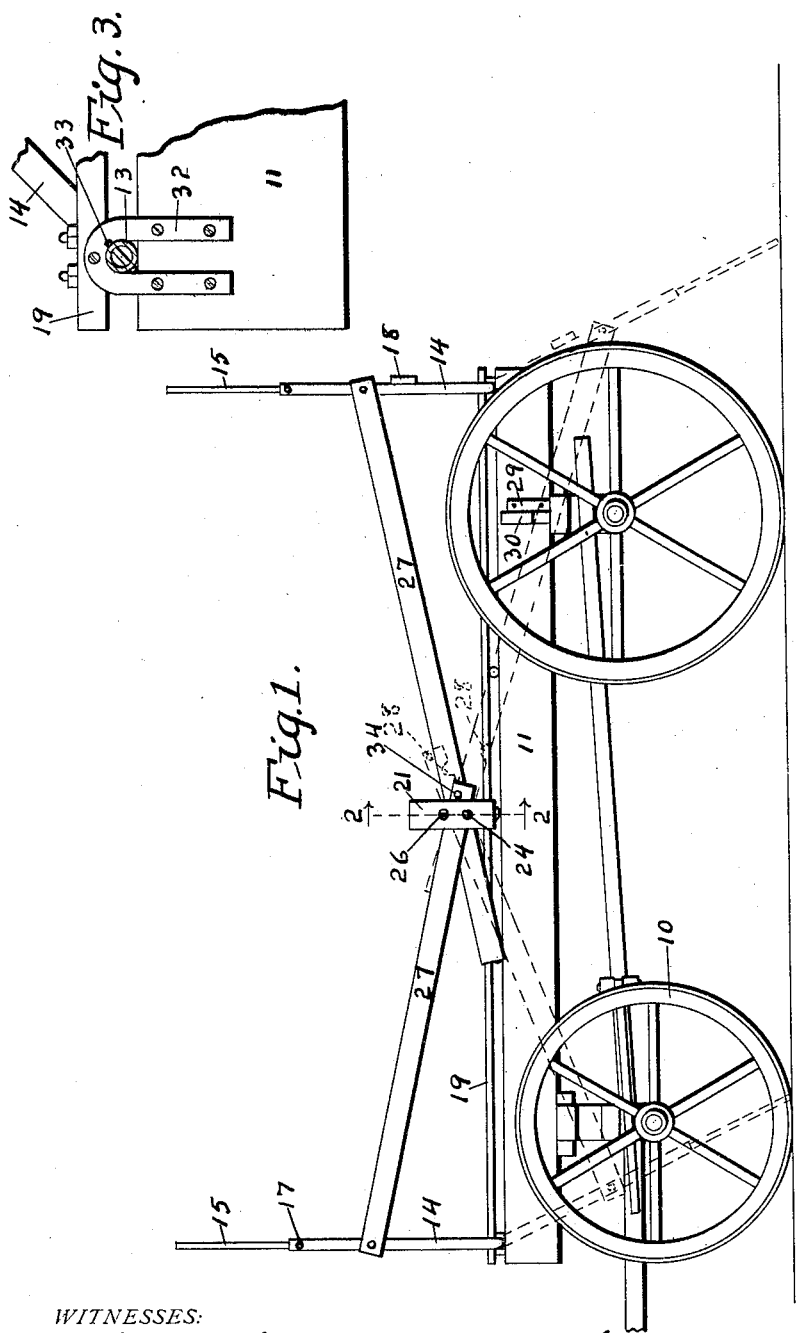

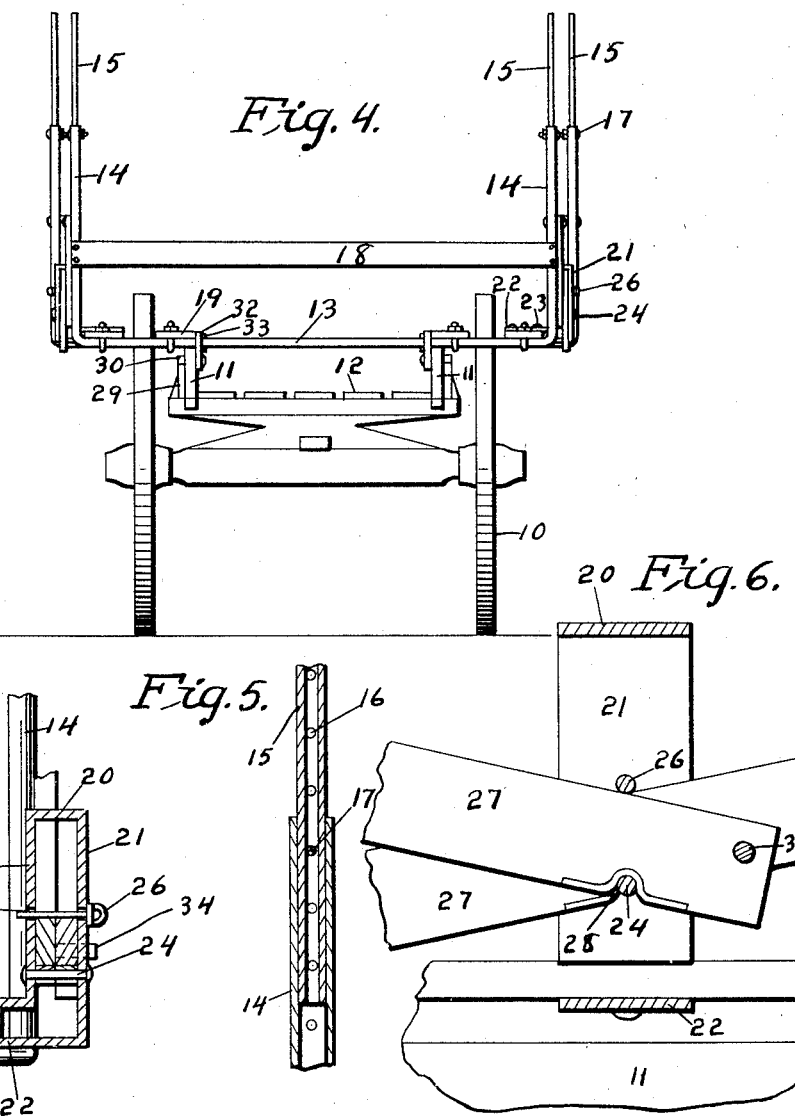

GEORGE S. WASHBURN, OF BELLE PLAINE, IOWA.

HAY-RACK.

1,111,982.

Specification of Letters Patent.

Patented Sept. 29, 1914.

Application filed March 24, 1913. Serial No. 756,604.

*To all whom it may concern:*

Be it known that I, GEORGE S. WASHBURN, a citizen of the United States, residing at Belle Plaine, R. F. D. #2, in the county of Benton and State of Iowa, have invented a certain new and useful Hay-Rack, of which the following is a specification.

The object of my invention is to provide a hay rack of simple, durable and inexpensive construction having its parts so constructed and arranged that by a simple adjustment thereof the wagon may be backed and the hay rack thereby raised and supported on the ground by its own members so that the wagon may be drawn away from it leaving the hay rack until it is desired to use it again.

My invention consists in certain details, in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a wagon and a hay rack thereon embodying my invention, the dotted lines showing the hay rack in position for removing it from the wagon. Fig. 2 shows a sectional view taken on the line 2—2 of Fig. 1. Fig. 3 shows a sectional, detail view of the manner in which the upright members are mounted on the rack. Fig. 4 shows a rear elevation of the wagon and rack shown in Fig. 1. Fig. 5 shows a detail, sectional view of the telescoping upright members, and Fig. 6 shows a detail, sectional view of the inner ends of the movable side members of the rack.

In the accompanying drawings, I have indicated by the reference numeral 10 the running gear of an ordinary wagon on which my rack is mounted. I provide a rack frame comprising ordinary longitudinal members 11 which rest above the bolsters and ordinary bottom members 12. I preferably provide cross members which however have been omitted from Fig. 4 of the drawings in order to more clearly show the important parts of my device.

Rotatably mounted on the upper surfaces of the longitudinally side members 11 at each end of the rack are horizontal rods 13 having at each end upward extensions 14. The members 13 and 14 may be made of gas pipe or other suitable material. The members 14 are hollow and they telescopically receive rods or pipes 15. The rods or pipes 15 are provided with a plurality of openings 16 to selectively receive bolts 17 which are extended through the upright members 14. It will readily be seen that by moving the bolt 17 and placing it in different openings 16, the total combined length of the members 14 and 15 of any of the uprights may be varied as desired. I preferably connect the members 14 at the rear end of the rack by means of a cross bar 18.

Longitudinal floor members 19 are supported by the members 13 which are rotatably mounted with relation to said longitudinal floor members 19. The members 19, it will be seen are higher than the bottom members 12, and are located outside of the longitudinal members 11. Secured to each of the outer members 19, near the middle thereof is a bracket which may be of any suitable form but, as shown in the drawings, is comprised of a piece of metal bent to form a horizontal top member 20 and vertical side members 21 substantially parallel with each other. The outer side member 21 extends below the lower end of the inner side member 21. At the lower end of each member 21 is an inward horizontal extension 22. The outer member 19 on each side of the rack is received between the members 22 and secured thereto by means of bolts 23.

I provide a bolt 24 extending through the members 21 on each side of the rack and above the bolt 24 each of the members 21 is provided with an opening 25. The openings 25 in the members 21 of each bracket register with each other and are designed to receive a removable pin 26.

Pivoted to each upright member 14 is a side member 27 which serves as a brace and also forms part of the basket portion of the rack. The members 27 extend slightly downwardly and toward the middle of the rack and their inner ends are slidably received side by side between the bolt 24 and the pin 26 and between the members 21 of the respective brackets. In the lower surface of each member 27 is a notch 28 shown in dotted lines in Fig. 1 designed to receive the bolt 24 when the members 14 are in vertical position. The pin 26 is so located that when the bolt 24 of each bracket is received in the notches 28 of the members 27 the pin 26 engages or almost engages the upper surfaces of the members 27, thereby preventing the raising of the inner ends of said members 27 and locking said members against the bolts 24, thereby preventing their longitudinal movement with relation to the brackets.

I provide on the side members 11 blocks 29, as shown in Fig. 1, designed to engage the rear surfaces of each of the bolsters 30 when the rack is in position on a wagon. The members 13 may be rotatably mounted upon the members 11 in any suitable manner. In the drawings, I have shown U-shaped brackets 32 for this purpose. Extended through each of the members 13 just outside the U-shaped brackets 32, I provide pins 33 whereby any longitudinal movement of the members 13 is limited. It may be noted that the members 27 which are pivoted to the rear upright members 14 extend considerably beyond the brackets in which the forward ends of said members are mounted. In the rearward ends of said members 27 which are pivoted to the forward upright members 14, I provide pins 34 which prevent the removal of said members 27 from the brackets. When it is desired to remove my improved rack from the wagon the pins 26 are removed from the brackets in which they are mounted and the arms 14 are swung rearwardly and downwardly until the arms 15 engage the surface on which the wagon stands, the parts then being in the positions shown by the dotted lines in Fig. 1. The collapsible arms 14 and 15 are so adjusted that when the arms 15 and 14 are dropped downwardly and rearwardly they will form an acute angle with the ground, as shown by dotted lines. The wagon is then backed. The bolster 30 will engage the block 29 and force the rack rearwardly thereby tending to elevate it and move the arms 14 and 15 to vertical position. When said arms reach the vertical position, the notches 28 will drop over the bolts 24 and the rack will be supported in its elevated position by the arms 15 and 14. By placing the pin 26 in position the rack can be locked and left until it is needed again.

The advantage of a device of the kind hereinbefore described is obvious. The removal of an ordinary hay rack is a work requiring great physical strength and of considerable difficulty. It is ordinarily necessary to lift the rack above the wheels and then to lower it to the ground or to an especially prepared support or stand. The manual labor of lifting the rack and lowering it is almost entirely done away with when my improved rack is used and the members of my rack form the support for it.

I claim as my invention:

1. A rack comprising a frame adapted to be placed on a running gear, standards pivotally mounted at the corners of the rack to swing from upright to suspended position, side members pivoted to the respective standards at points spaced from their pivotal points, brackets at the sides of said rack near the middle thereof, slidingly receiving said side members, means for locking said side members to said brackets.

2. A rack comprising a frame adapted to be placed on a running gear, standards pivotally mounted at the corners of the rack to swing from upright to position extending downwardly for supporting the rack, a side member pivoted to each of said standards at points spaced from the pivotal points thereof and extending to points at the sides of the rack near the transverse center thereof, said side members being slidably mounted on the frame, and means for securing said side members to the rack in various positions of the standards.

3. In a device of the class described, a hay rack, comprising a frame, horizontal transverse members rotatably mounted on said frame near each end thereof, parallel right angled extensions on each end of said horizontal members, members adjustably and telescopically mounted on said extensions, longitudinal members mounted on said horizontal members to permit the free rotation thereof, side frame members each pivoted to one of said extensions above the level of the main body of the rack extending downwardly and toward the transverse middle of the rack, brackets secured to the outer longitudinal members and slidingly receiving the inner ends of said side frame members on each side of the rack, each of said side members being provided on its lower surface with a notch, bolts in said brackets received in said notches, and removable pins in said brackets above said side members designed to secure said side members in engagement with said bolts.

Des Moines, Iowa, March 6, 1913.

GEORGE S. WASHBURN.

Witnesses:
G. R. N. Lewis,
C. W. Housman.